United States Patent
Houst et al.

(10) Patent No.: US 9,777,737 B2
(45) Date of Patent: Oct. 3, 2017

(54) ADJUSTABLE COMPRESSOR TRIM

(71) Applicant: HONEYWELL INTERNATIONAL INC., Morristown, NJ (US)

(72) Inventors: Vit Houst, Sestajovice (CZ); Josef Ferda, Brno (CZ); Milan Nejedly, Morristown, NJ (US); Daniel Turecek, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 522 days.

(21) Appl. No.: 14/353,893

(22) PCT Filed: Nov. 13, 2012

(86) PCT No.: PCT/US2012/064796
§ 371 (c)(1),
(2) Date: Apr. 24, 2014

(87) PCT Pub. No.: WO2013/074503
PCT Pub. Date: May 23, 2013

(65) Prior Publication Data
US 2014/0308110 A1     Oct. 16, 2014

Related U.S. Application Data

(60) Provisional application No. 61/559,233, filed on Nov. 14, 2011.

(51) Int. Cl.
*F02B 37/22*     (2006.01)
*F04D 27/00*     (2006.01)
(Continued)

(52) U.S. Cl.
CPC ............ *F04D 27/002* (2013.01); *F02B 37/22* (2013.01); *F04D 27/0246* (2013.01);
(Continued)

(58) Field of Classification Search
CPC .... F04D 27/002; F04D 27/0246; F02B 37/22; F02K 1/085
See application file for complete search history.

(56) References Cited

U.S. PATENT DOCUMENTS 2,083,447 A   6/1937 Hoffman
4,005,579 A   2/1977 Lloyd
(Continued)

FOREIGN PATENT DOCUMENTS

DE   21 14 702 A1   10/1972
DE   4411678 A1   10/1995
(Continued)

OTHER PUBLICATIONS

Written Opinion, PCT/US2012/064796, Mar. 25, 2013 (10 pages).
(Continued)

*Primary Examiner* — Kevin Murphy
(74) *Attorney, Agent, or Firm* — Brian J. Pangrie

(57) ABSTRACT

An assembly can include a compressor housing, an adjustable wall disposed within the compressor housing that defines an air inlet to an inducer portion of a compressor wheel, and an adjustment mechanism to adjust the wall and thereby adjust at least a diameter of the air inlet. Various other examples of devices, assemblies, systems, methods, etc., are also disclosed.

12 Claims, 15 Drawing Sheets

(51) Int. Cl.
*F04D 27/02* (2006.01)
*F04D 29/42* (2006.01)
*F04D 29/68* (2006.01)

(52) U.S. Cl.
CPC ..... *F04D 27/0253* (2013.01); *F04D 29/4213* (2013.01); *F04D 29/681* (2013.01); *Y02T 10/144* (2013.01)

(56) References Cited

U.S. PATENT DOCUMENTS

| | | | | |
|---|---|---|---|---|
| 4,503,684 | A | * | 3/1985 | Mount ................ F04D 27/0246 415/14 |
| 4,776,168 | A | * | 10/1988 | Woollenweber ...... F01D 17/141 60/602 |
| 4,969,798 | A | * | 11/1990 | Sakai ................ F04D 27/0246 415/150 |
| 5,683,223 | A | * | 11/1997 | Harada .................. F04D 27/02 415/17 |
| 8,276,364 | B2 | * | 10/2012 | Levasseur ............... F02K 1/085 239/265.39 |
| 2004/0096316 | A1 | | 5/2004 | Simon et al. |
| 2006/0037316 | A1 | | 2/2006 | Richey |
| 2006/0117749 | A1 | | 6/2006 | Sumser |
| 2007/0144172 | A1 | | 6/2007 | Sumser et al. |
| 2008/0276613 | A1 | | 11/2008 | Noelle et al. |
| 2009/0301082 | A1 | * | 12/2009 | Lombard .............. F01D 17/143 60/602 |

FOREIGN PATENT DOCUMENTS

| | | |
|---|---|---|
| DE | 10 2005 019938 A1 | 11/2006 |
| DE | 10 2010 026 176 A1 | 1/2012 |
| DE | 10 2011 121 996 B4 | 7/2013 |
| EP | 1 947 299 A2 | 7/2008 |
| GB | 957 884 A | 5/1964 |
| JP | 3719337 B2 | 9/2005 |
| WO | 2011038240 A1 | 3/2011 |

OTHER PUBLICATIONS

Uchida et al., Development of Wide Flow Range Compressor with Variable Inlet Guide Vane, Special Issue Turbocharger Technologies, R&D Review of Toyota CRDL, vol. 41, No. 3, 2006 (6 pages).
EPO Supplementary European Search Report EP 12 85 0581, Jun. 29, 2015 (3 pages).
EPO European Exam Report EP 12 85 0581.5, Jul. 14, 2015 (6 pages).
EPO European Exam Report EP 12 85 0581.5, Dec. 5, 2016 (6 pages).

\* cited by examiner

ADJUSTABLE COMPRESSOR TRIM

RELATED APPLICATION

This application claims the benefit of a U.S. Provisional Patent Application having Ser. No. 61/559,233, filed 14 Nov. 2011, entitled "Adjustable Compressor Trim", which is incorporated herein by reference.

TECHNICAL FIELD

Subject matter disclosed herein relates generally to turbomachinery for internal combustion engines and, in particular, to adjustable trim compressor assemblies.

BACKGROUND

Turbochargers are frequently utilized to increase performance of an internal combustion engine. A turbocharger can extract energy from an engine's exhaust via a turbine to drive a compressor that compresses intake air directed to the engine. Turbochargers typically rely on a radial or centrifugal compressor wheel or wheels. In general, intake air is received at an inducer portion of a compressor wheel and discharged radially at an exducer portion. The discharged air is then directed to a volute, usually via a diffuser section.

A compressor may be characterized by a compressor flow map. A compressor flow map (e.g., a plot of pressure ratio versus mass air flow) can help characterize performance of a compressor. In a flow map, pressure ratio is typically defined as the air pressure at the compressor outlet divided by the air pressure at the compressor inlet. Mass air flow may be converted to a volumetric air flow through knowledge of air density or air pressure and air temperature.

Various operational characteristics define a compressor flow map. One operational characteristic of a compressor is commonly referred to as a surge limit, while another operational characteristic is commonly referred to as a choke area. A map may be considered as presenting an operating envelope between a choke area or line and a surge area or line.

Choke area results from limitations associated with the flow capacity of the compressor stage. In general, compressor efficiency falls rapidly as the local Mach number in the gas passage approaches unity. Thus, a choke area limit typically approximates a maximum mass air flow.

A surge limit represents a minimum mass air flow that can be maintained at a given compressor wheel rotational speed. Compressor operation is typically unstable in this area. Strong fluctuation in pressure and flow reversal can occur in this area.

In general, compressor surge stems from flow instabilities that may be initiated by aerodynamic stall or flow separation in one or more of compressor components (e.g., as a result of exceeding a limiting flow incidence angle to compressor blades or exceeding a limiting flow passage loading).

For a turbocharged engine, compressor surge may occur when the engine is operating at high load or torque and low engine speed, or when the engine is operating at a low engine speed with a high rate of exhaust gas recirculation (e.g., EGR). Compressor surge may also occur when a relatively high specific torque output is required of an engine with a variable nozzle turbine (VNT) or an electrically assisted turbocharger. Additionally, surge may occur when a rapid intake air boost is initiated using an electric motor or VNT mechanism, or when an engine is suddenly decelerated (e.g., consider a closed throttle valve while shifting gears).

Various technologies described herein pertain to compressor assemblies where, for example, one or more components can optionally allow for adjusting width of a compressor map (e.g., by delaying surge).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
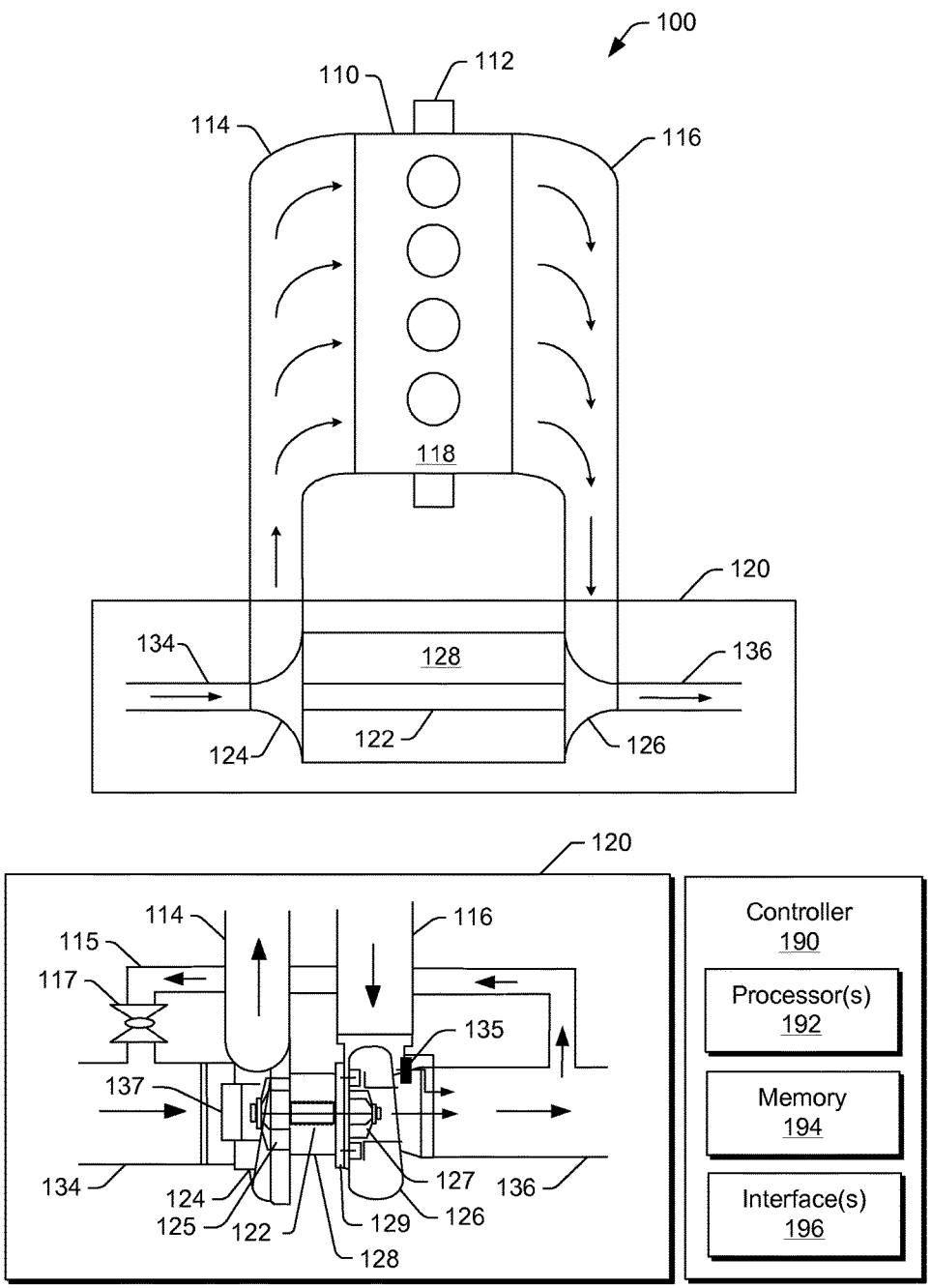
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

Also shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In operation, the turbocharger 120 acts to extract energy from exhaust of the internal combustion engine 110 by passing the exhaust through the turbine 126. As shown, rotation of a turbine wheel 127 of the turbine 126 causes rotation of the shaft 122 and hence a compressor wheel 125 (e.g., impeller) of the compressor 124 to compress and enhance density of inlet air to the engine 110. By introducing an optimum amount of fuel, the system 100 can extract more specific power out of the engine 110 (e.g., compared to a non-turbocharged engine of the same displacement). As to control of exhaust flow, in the example of FIG. 1, the turbocharger 120 includes a variable geometry unit 129 and a wastegate valve 135. The variable geometry unit 129 may act to control flow of exhaust to the turbine wheel 127. The wastegate valve (or simply wastegate) 135 is positioned proximate to the inlet of the turbine 126 and can be controlled to allow exhaust from the exhaust port 116 to bypass the turbine wheel 127.

On the compressor side, an inlet 137 is shown as being disposed in front of the compressor wheel 125. As described herein, the inlet 137 may be defined by a fixed component (e.g., optionally replaceable) or an adjustable component. Adjustment of such a component may occur in response to a control signal, operational conditions, environmental conditions, etc. For example, where an adjustment in width of a compressor map is desired, a control signal may instruct an actuator to alter an inlet to a compressor wheel, an operational pressure (e.g., air, exhaust, etc.) may automatically cause an alteration in an inlet to a compressor wheel, or an atmospheric pressure or pressure of a moving vehicle may automatically cause an alteration in an inlet to a compressor wheel. In the example of FIG. 1, the inlet 137 may be a variable geometry inlet (e.g., a variable geometry assembly that can allow for adjustment of geometry of an inlet to a compressor wheel).

To provide for exhaust gas recirculation (EGR), the system 100 may include a conduit to direct exhaust to an intake path. As shown in the example of FIG. 1, the exhaust outlet 136 can include a branch 115 where flow through the branch 115 to the air inlet path 134 may be controlled via a valve 117. In such an arrangement, exhaust may be provided upstream of the compressor 124.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an exhaust gas recirculation valve, an electric motor, or one or more other components associated with an engine, a turbocharger (or turbochargers), etc. As an example, control logic may be in the form of processor-executable instructions stored in one or more processor-readable storage media (e.g., consider the memory 194).

Figure 2:
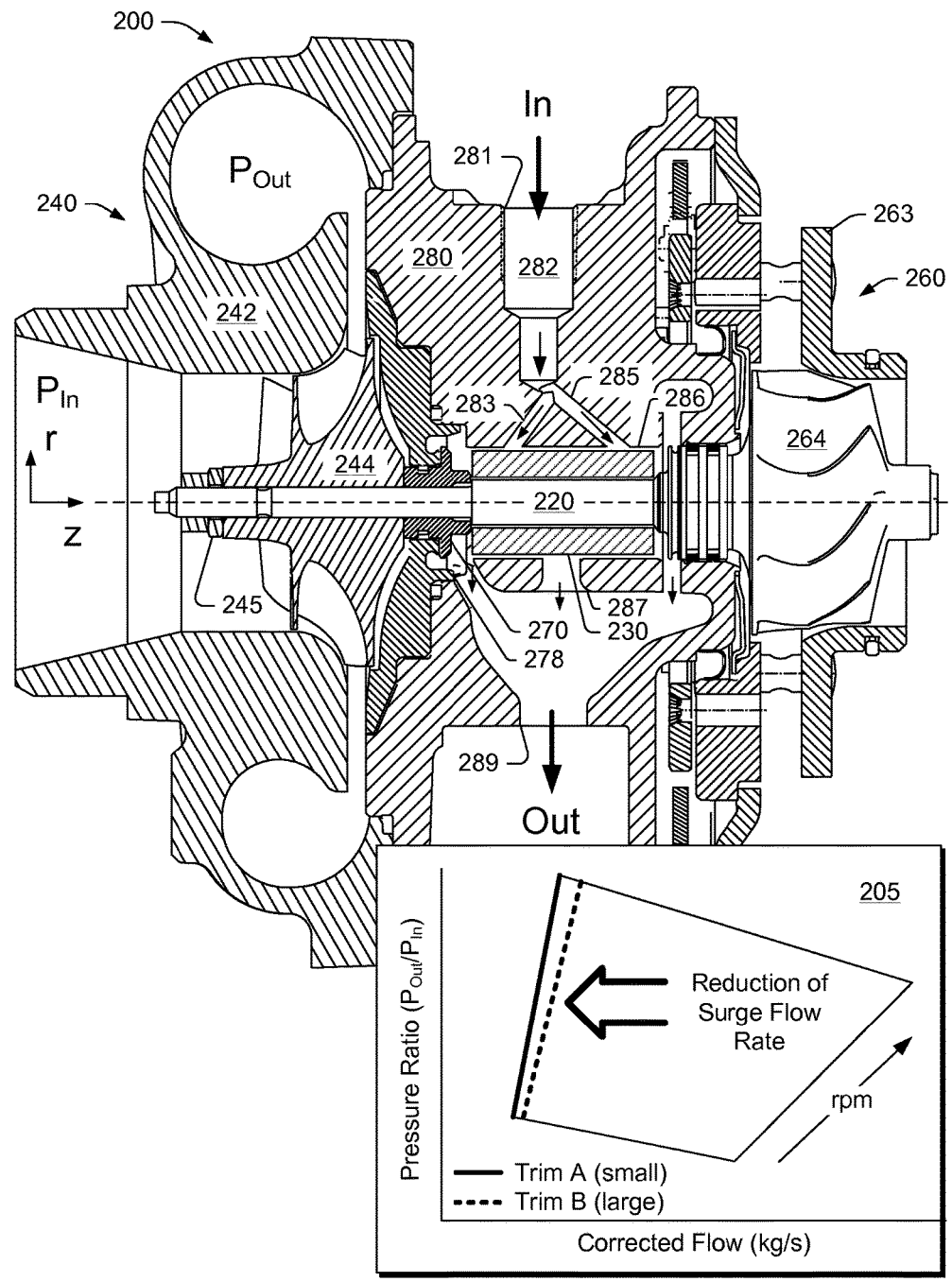
FIG. 2 is a cross-sectional view of an example of a turbocharger assembly along with an example of a compressor map.

FIG. 2 shows an example of a turbocharger assembly 200 that includes a shaft 220 supported by a bearing or bearing assembly 230 disposed in a housing 280 between a compressor 240 and a turbine 260. As to the bearing or bearing assembly 230, a journal bearing, journal bearings, a rolling element bearing assembly, rolling element bearing assemblies or other type of bearing(s) or bearing assembly(ies) may be provided to rotatably support the shaft 220 in the center housing 280.

In the example of FIG. 2, the assembly 200 also includes a thrust collar 270 disposed about the shaft 220 at least partially in a bore of a compressor plate 278. As shown, the compressor 240 includes a compressor housing 242 that defines a volute and that houses a compressor wheel 244. In the example of FIG. 2, a surface of the compressor housing 242, a surface of the compressor plate 278 and a surface of the housing 280 form a diffuser section intermediate an exducer portion of the compressor wheel 244 and the volute of the compressor housing 242.

In the example of FIG. 2, the compressor wheel 244 includes a bore that receives a portion of the shaft 220 upon which a nut 245 is threaded (e.g., upon threads of the shaft 220) to rotatably secure the compressor wheel 244 to the shaft 220. As shown in FIG. 2, an end of the shaft 220 extends axially beyond the nut 245 and the compressor wheel 244. Further, a hub portion of the compressor wheel 244 extends axially beyond an inducer portion of the compressor wheel 244.

As mentioned, the compressor wheel 244 includes an inducer portion (intended for inlet flow) and an exducer portion (intended for outlet flow). The inducer portion may be defined in part by an inducer diameter (or radius) and the exducer portion may be defined in part by an exducer diameter (or radius). Given these two diameters (or radii), a trim or area ratio may be determined for the compressor wheel 244. For example, for an inducer diameter of 53.1 mm and an exducer diameter of 71.0 mm, trim may be determined as follows: $100*(53.1^2/71.0^2)=56$. The trim of a wheel, whether compressor or turbine, affects performance, for example, with other factors held constant, a higher trim wheel will flow more than a smaller trim wheel.

In the example of FIG. 2, the turbine 260 is shown as including a base and shroud assembly 263 (e.g., a nozzle ring and an insert of a variable geometry mechanism) that defines a throat to direct exhaust to an inducer portion of a turbine wheel 264. The assembly 200 may also include a turbine housing (see, e.g., the turbine 126 of FIG. 1) that defines a volute to receive exhaust from an internal combustion engine and that includes a cylindrical wall portion to receive exhaust passing the turbine wheel 264 and direct such exhaust to an exhaust system. The turbine 260 provides for transfer of energy from exhaust to the turbine wheel 264 as it passes from an inducer portion to an exducer portion of the turbine wheel 264. As an example, vanes may be disposed between a base portion and a shroud portion of the base and shroud assembly 263 to form throats (e.g., between adjacent vanes). In such an example, the vanes may be adjustable, for example, in response to one or more criteria to alter flow of exhaust from a volute of a turbine housing to the inducer portion of the turbine wheel 264.

As shown in FIG. 2, the turbine wheel 264 is connected to the shaft 220 to form a shaft and wheel assembly (SWA). As to an assembly process, as an example, a shaft and wheel assembly (SWA) may be inserted into a center housing (e.g., with a bearing, bearing assembly, etc.) and a compressor wheel may be fitted to an end of the shaft, for example, via a full bore (e.g., the compressor wheel 244), a partial bore or an extension of the compressor wheel.

In the example of FIG. 2, the housing 280 includes a lubricant inlet 281 and a lubricant outlet 289 such that lubricant can flow from the inlet 281 to the outlet 289 via a bore 282 that directs lubricant to various lubricant passages with openings along an axial bore 286 of the housing 280. For example, lubricant may flow via a compressor side bearing lubricant passage 283 and a turbine side bearing lubricant passage 285 to the axial bore 286 to provide lubricant to the bearing assembly 230. Lubricant may exit the bore 286 via a compressor end, a turbine end or a passage 287 disposed between the compressor end and the turbine end. The outlet 289 collects lubricant that flows through or around the bearing assembly 230, which may be cooled, filtered, etc., and eventually recirculated to the inlet (e.g., via a lubricant pump of an internal combustion engine). To assist with flow of lubricant, the inlet 281 and the outlet 289 may be aligned with gravity. During operation, pressurized lubricant may be provided to the inlet 281, for example, by a lubricant pump associated with an internal combustion engine.

FIG. 2 also shows an example of a compressor map 205, which includes surge lines for two compressor wheel trims: Trim A and Trim B. In the example of FIG. 2, Trim A is less than Trim B, thus theoretically the compressor wheel with Trim B provides for more flow; however, as the surge line moves to the left, a compressor may operate at lower corrected flow for a given pressure ratio. Thus in the example of FIG. 2, the compressor wheel with Trim A can operate a lower flow with reduce risk of surge when compared to the compressor wheel with Trim B.

Figure 3:
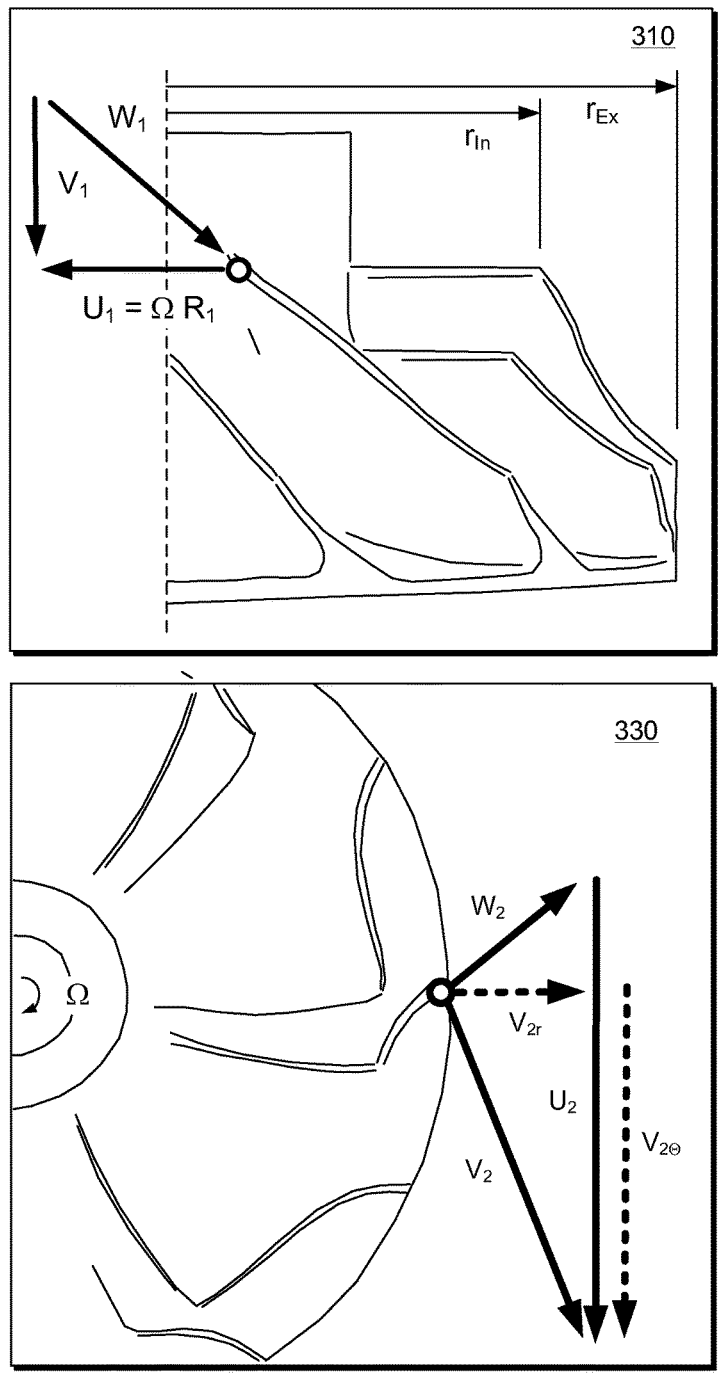
FIG. 3 is a series of views of an example of a compressor wheel with vector diagrams.

FIG. 3 shows an example of a compressor wheel along with flow vectors for an inducer portion 310 (see, e.g., inducer radius $r_{in}$) and an exducer portion 330 (see, e.g., exducer radius $r_{Ex}$). As indicated, the absolute air velocity is first axial and then radial. When driven (e.g., belt, exhaust, motor, etc.), the rotational frequency of the wheel allows for calculation of a blade velocities. For example, a point on the inducer portion rotates with a blade velocity $U_1$ while a point on the exducer portion rotates with a blade velocity $U_2$. The absolute air velocity V (see, e.g., $V_1$, $V_{2r}$ and $V_{2\Theta}$) at these points allows for calculation of a relative air velocity W (see, e.g., $W_1$ and $W_2$). A vector diagram can represent these directions and magnitudes, as indicated in FIG. 3.

As explained with respect to the plot 205 of FIG. 2, it is possible to tailor a compressor map of a turbocharger via selection of compressor wheel trim (e.g., via selection of inducer diameter and/or exducer diameter). As described herein, as an example, a compressor map may be tailored by altering geometry of an inlet to a compressor wheel to thereby alter inlet velocity (see, e.g., $V_1$ in FIG. 3). For example, an alteration can change $V_1$, which can alter the incidence angle (see, e.g., angle of $W_1$ in FIG. 3), which can move the surge line of the compressor map (e.g., optionally to achieve a wider map). Such an approach may also suppress air recirculation at a surge line, improve efficiency in a surge line region, etc. As an example, an alteration may alter cross-sectional flow area to an inducer portion of a compressor wheel, which can act to increase or decrease inlet velocity to the inducer portion (see, e.g., $V_1$ in FIG. 3).

Figure 4:
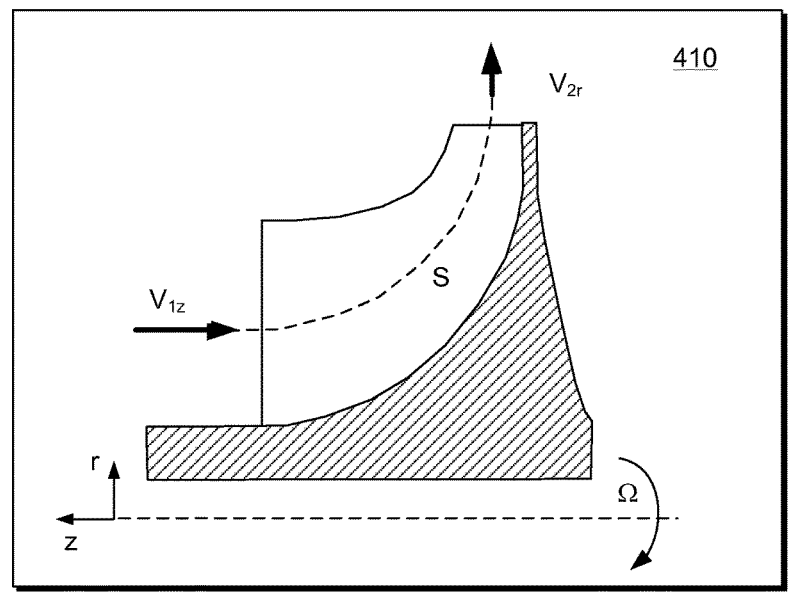
FIG. 4 is a series of views of an example of a compressor wheel with vector diagrams.
Figure 4:
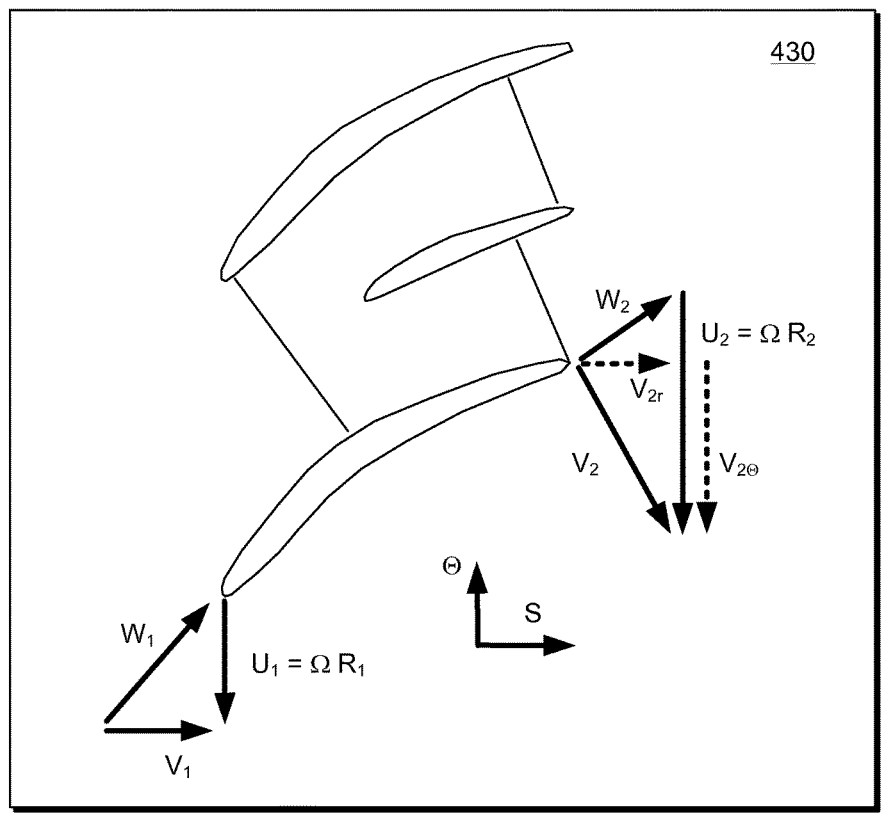

FIG. 4 shows a diagram of an example of a compressor wheel with absolute air velocity vectors along a blade 410 and a diagram of a cross-section of an example of a blade with vector diagrams for blade velocity (U), absolute air velocity (V) and relative air velocity (W) 430. As indicated, the diagram 430 shows the cross-section with respect to S and $\Theta$ where S is a streamwise direction coordinate and $\Theta$ is a tangential direction coordinate.

Figure 5:
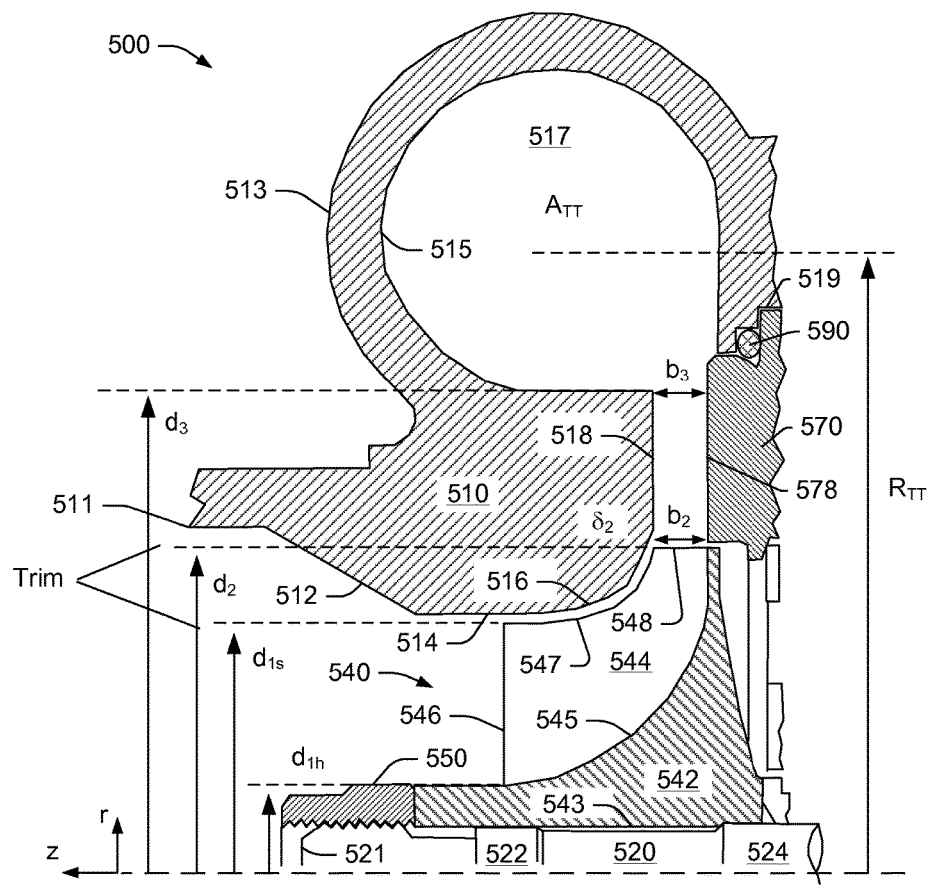
FIG. 5 is a cross-sectional view of an example of a compressor wheel with various dimensions.

FIG. 5 shows a cross-sectional view of an example of a compressor assembly 500 along with various dimensions and equations. The compressor assembly 500 includes a compressor housing 510, a shaft 520, a compressor wheel 540, a nut 550, a backplate 570 and a seal element 590. In the example of FIG. 5, the compressor housing 510 includes various surfaces that define a flow passage in which the compressor wheel 540 is partially disposed. The surfaces include a surface 511 disposed at a large diameter, an angled surface 512 (e.g., a tapered surface), a surface 514 disposed at a smaller diameter, a shroud surface 516 of increasing diameter and a diffuser surface 518 that extends radially outwardly to a surface 515 that defines, at least in part, a volute 517. The surfaces 511, 512, 514, 515, 516, and 518 may be referred to as inner surfaces of the compressor housing 510 while a surface 513 may be referred to as an outer surface of the compressor housing 510.

In the example of FIG. 5, the compressor wheel 540 includes a hub 542 with a through bore 543 for receipt of the shaft 520, which includes a shaft end 521, and locating surfaces 522 and 524. As shown, shaft threads of the shaft 520 and complimentary nut threads of the nut 550 allow for fixing the compressor wheel 540 to the shaft 520. As shown, a blade 544 extends from the hub 542 where the blade 544 includes a hub edge 545, a leading edge 546, a shroud edge 547, and a trailing edge 548. A clearance exists between the shroud edge 547 and the compressor housing 510, for example, along the shroud surface 516, noting a clearance $\delta_2$ at the trailing edge 548.

In the example of FIG. 5, a diffuser section is defined by the surface 518 of the compressor housing 510 and a surface 578 of the backplate 570. Along a surface 519, the compressor housing 510 forms a joint with the backplate 570 where the sealing element 590 is disposed therein to seal the flow passage (e.g., diffuser section, volute, diffuser section and volute). As an example, the joint may be an annular joint and the sealing element 590 may be cylindrical (e.g., an O-ring).

The equations in FIG. 5 pertain to trim, an exit area to inlet area ratio, a diffuser section exit area to inlet area ratio and a compressor housing A/R ratio. As shown, trim is an inducer area function that depends on a diameter of an inducer portion ($d_{1s}$) and a diameter of an exducer portion ($d_2$). While these diameters may be defined with respect to a compressor wheel, as described herein, an inlet to a compressor wheel may be selected or adjusted to thereby effectively alter trim. For example, a diameter of the surface 511, the surface 512 or the surface 514 may be altered to effectively alter the inlet cross-sectional area to the inducer portion of the compressor wheel 540 to effectively alter $d_{1s}$ with respect to $d_2$ and compressor performance (e.g., as exhibited by a compressor map). For example, by decreasing inlet cross-sectional area, trim may be reduced to move a surge line toward lower corrected flow and, by increasing inlet cross-sectional area, trim may be increased to move a surge line toward higher corrected flow. Where a control mechanism (see, e.g., the controller 190 of FIG. 1) is provided such alterations may occur responsive to one or more conditions (e.g., engine power demand, engine emissions, atmospheric pressure, compressor or exhaust backpressure, ambient temperature, exhaust temperature, compressed air temperature, exhaust gas recirculation, etc.).

Figure 6:
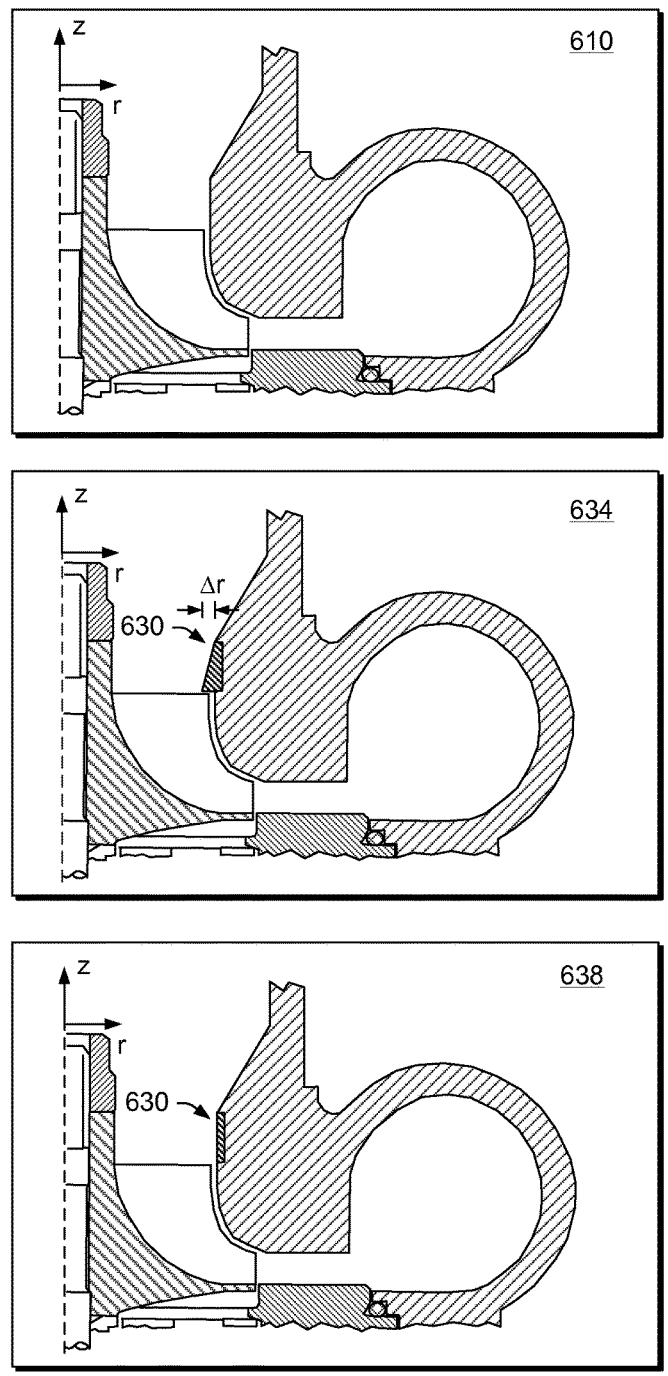
FIG. 6 is a series of cross-sectional views of examples of compressor assemblies.

FIG. 6 shows cross-sectional views of examples of a compressor assembly with fixed trim 610 and another compressor assembly with an adjustable trim mechanism 630 adjusted to a low trim state 634 and adjusted to a high trim state 638 (as to other features, see, e.g., various dimensions, etc., as described with respect to the assembly 500 of FIG. 5). As to the adjustable trim, in FIG. 6, adjustment to geometry of the inlet near the inducer portion alters both cross-sectional flow area and angle of flow at the wall of the inlet. With respect to the vector diagrams of FIGS. 3 and 4, the inlet air velocity will deviate from axial, which, in turn, will alter the relative air velocity (e.g., for a given blade velocity). In the example state 634 of FIG. 6, the surge line will be shifted to an area of lower mass flow and will also result in an efficiency improvement when compared to the example state 638 of FIG. 6 (e.g., or the example 610).

Figure 7:
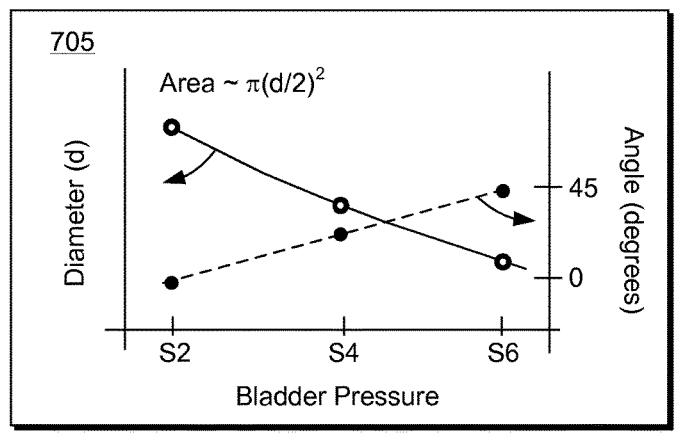
FIG. 7 is a series of cross-sectional views of an example of a compressor assembly along with a plot of diameter and angle versus pressure to control an adjustment mechanism.
Figure 7:
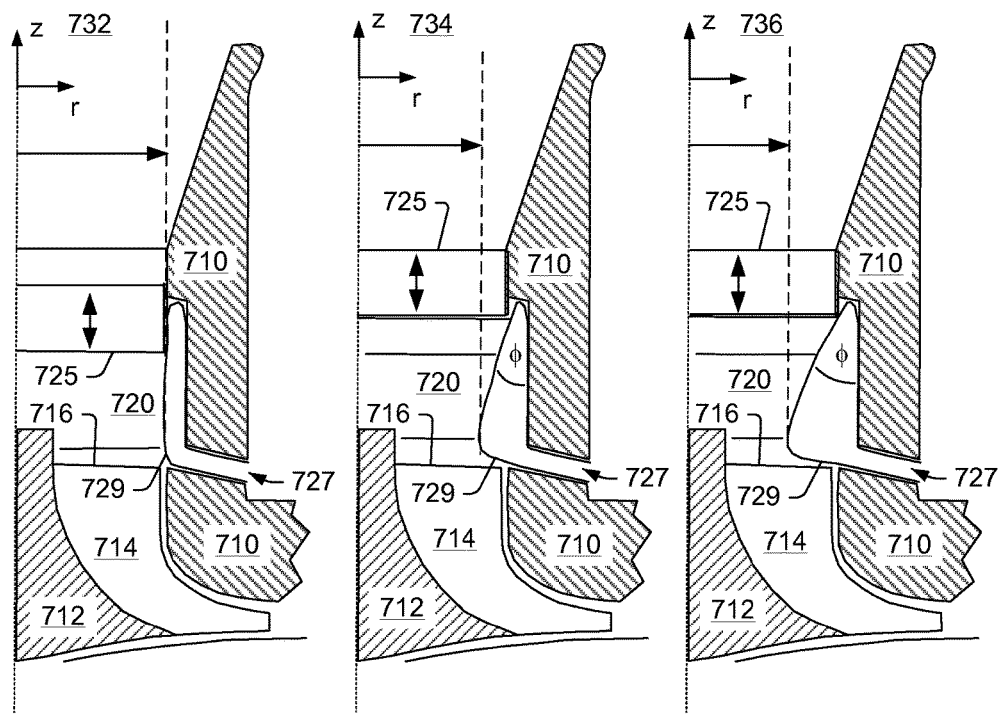

FIG. 7 shows an example of a mechanism 720 that can operate as shown in a plot 705 of diameter and wall angle versus bladder pressure. Various examples are shown 732, 734 and 736 for an assembly that includes a housing 710, a wheel 712 having blades such as the blade 714, which has an upper edge 716 (e.g., an inducer edge). In the example of FIG. 7, the mechanism 720 includes a bladder 729 with an inlet 727 (e.g., an annular bladder with an inlet to control pressure of the bladder). As an example, the bladder may be constructed from a durable, elastic material (e.g., an elastomer that may expand and contract to alter volume of the bladder). As an example, a bladder may be constructed form a fluoroelastomer (e.g., formulated to withstand operational temperatures of an inlet portion of a compressor housing). As an example, a VITON™ elastomer (DuPont), a DYNEON™ elastomer (3M), a DAI-EL™ elastomer (Daikin), a TECNOFLON™ elastomer (Solvay), or a FLUOREL™ elastomer (3M) may be used.

In FIG. 7, the example 732 corresponds to no significant pressure differential or for a negative pressure differential (e.g., vacuum, etc.) such that the bladder 729 is in a normal or retracted state (e.g., a flat profile along the inlet portion to the wheel). As pressure increases, per the example 734, the bladder 729 expands and acts to alter geometry of the inlet near the inducer portion (see, e.g., radial dimension and angle). As pressure increases even more, per the example 736, the bladder 729 decreases the diameter and increases the angle of the inlet wall (see, e.g., radial dimension and angle). As described herein, angle of an inlet wall and diameter of an inlet may both be altered by an adjustment mechanism such as the mechanism 720.

As shown in the example of FIG. 7, the bladder 729 is disposed in a recess of the housing 710 such that a lower portion of the bladder 729 clears the edge 716 of the blade 714. Further, the recess may include a lower wall disposed at an angle to direct the lower portion of the bladder 729 away from the edge 716 of the blade 714. As an example, the housing 710 may include an opening for the inlet 727 and another opening for an outlet. In such an example, a positive pressure may be regulated at the inlet to increase size of the bladder 729 and the outlet may be regulated to decrease size of the bladder 729. For example, a valve may be provided to regulate an increase in bladder size and another valve may be provided to regulate a decrease in bladder size.

As indicated in the example of FIG. 7, an optional small fixed or adjustable wall 725 may act independently or cooperatively with the bladder mechanism 720. For example, the wall 725 may descend axially to alter angle of the bladder 729 and hence wall angle of the inlet to the inducer portion of the wheel 712. In such an example, as the wall 725 descends toward the wheel 712, the bladder 729 changes shape. Such shape and wall position may be known a priori and relied on in a control scheme to adjust a compressor map (e.g., adjust a surge line). The wall 725 may act to alter the space (e.g., volume) available for expansion of the bladder 729. The wall 725 may include an actuation mechanism that optionally responds to the pressure at the inlet to the bladder 729. For example, the wall 725 may be spring loaded and forced upward as the bladder 729 expands and that snaps downward when the bladder contracts 729. In such an example, the wall 725 may cover a recess in the housing 710 as provided for the bladder 729, for example, which may allow for use of the housing 710 in instances where a bladder or operational features thereof are not provided. The wall 725 may form a relatively air tight seal, for example, in a position that closes off a recess in the housing 710. As an example, the wall 725 may be a cylindrical wall having a wall inner diameter, a wall outer diameter, a wall thickness and a wall height. As an example, an actuation mechanism may connect to the wall 725 to allow for axial translation of the wall 725 within the housing 710. Such an actuation mechanism may include an arm or lever that extends from the wall 725 to an outer surface of the housing 710 (e.g., to operably link the arm or lever to an actuator, controller, etc.).

As an example, S2, S4 and S6 may correspond to predetermined settings selectable via a controller (e.g., to control pressure of the bladder 729 of the mechanism 720) where settings S2, S4 and S6 provide for particular cross-sectional flow areas and taper angles (e.g., as shown in the plot 705).

As described herein, for example, a compressor inlet can be modified via set of lamellae connected to a membrane, diaphragm spring, unison ring, etc. Such features can optionally alter inlet area into compressor and hence change inlet speed, which results in change of a velocity vector triangle of the compressor. Further, such features may optionally provide for alteration of inlet velocity direction (e.g., altering angle of a wall of an inlet). As described herein, a bladder or diaphragm can be actuated by, for example, vacuum or compressor outlet pressure (e.g., where a reduced pressure may be generated by a venturi).

Figure 8:
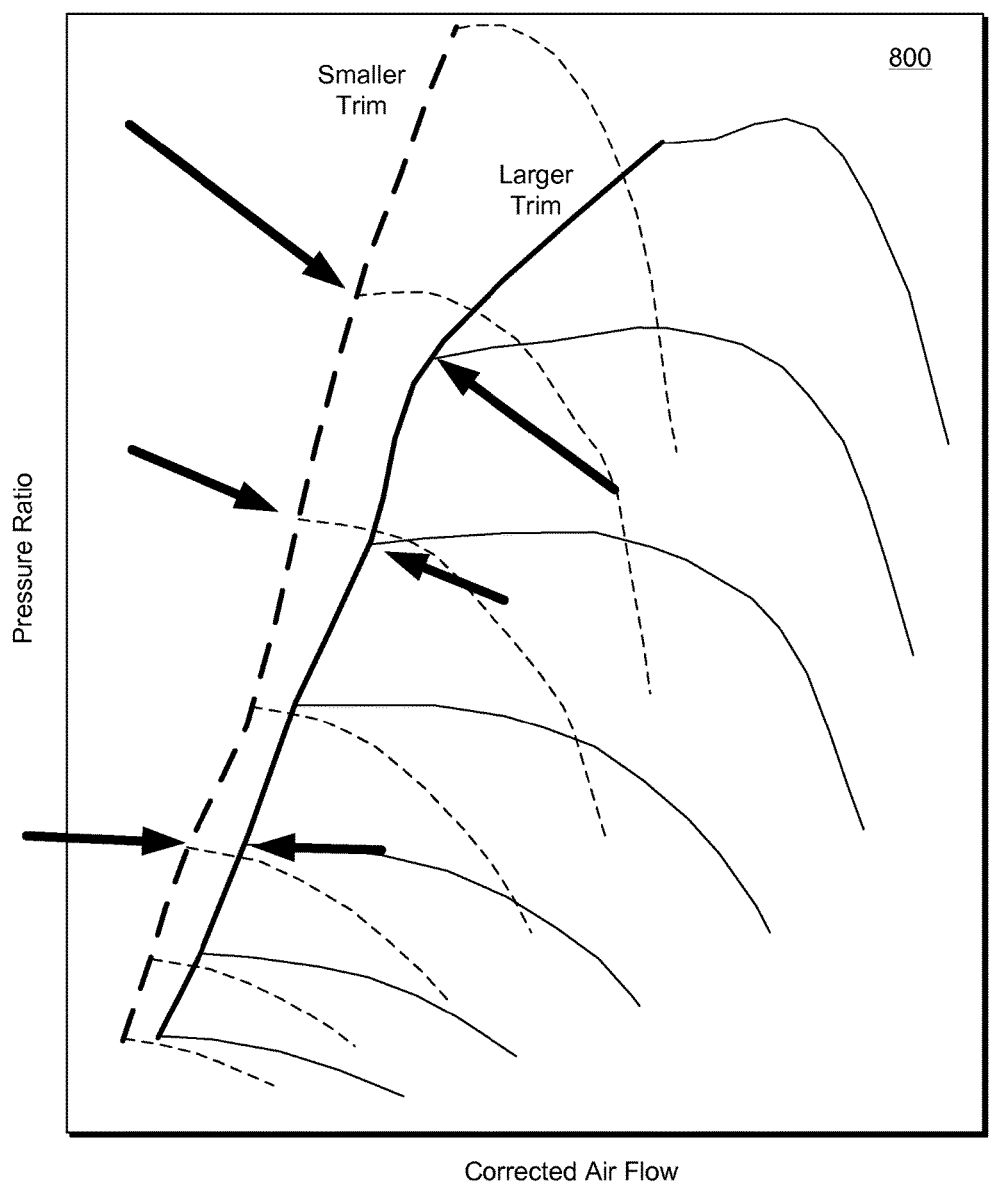
FIG. 8 is an example of a compressor map.

FIG. 8 shows an example of a compressor map 800 where a smaller diameter inlet (e.g., smaller trim) has a surge line shifted to the left (lower corrected air flow). As described herein, an adjustable trim compressor may include two surge lines as limits where the surge line may be adjusted between these limits, for example, to improve performance, reliability, etc.

Figure 9:
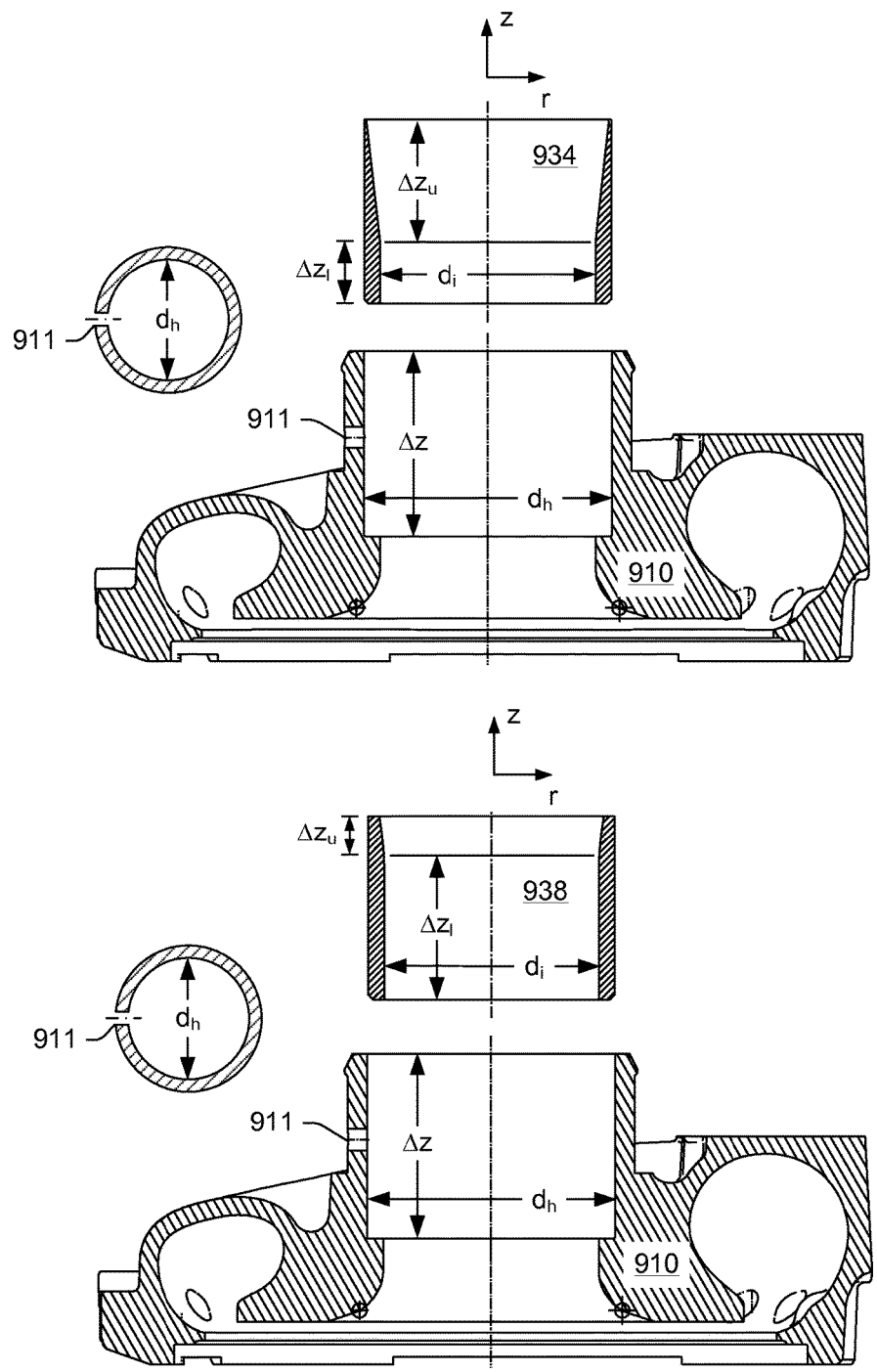
FIG. 9 is a series of cross-sectional views of an example of a housing and examples of inserts that may be received by the housing.

FIG. 9 shows a housing 910 configured to receive either of two fixed replacement components 934 and 938 and optionally an adjustable component capable of having one or more dimensions adjusted to thereby adjust trim. In such an example, depending on operational requirements, an inlet component may be selected to provide a particular compressor map. As an example, the housing 910 can include a bore 911 for an actuation component, an actuation pressure, etc., to actuate an adjustable component to thereby adjust trim (see, e.g., cross-sectional view of a portion of the housing 910 at an axial height of the bore 911). For example, an adjustable component may include a bladder (see, e.g., the example of FIG. 7) where the bore 911 provides a passage for pressurizing and depressurizing the bladder.

As shown in FIG. 9, the component 934 has a different wall profile than the component 938 (e.g., to provide for selection of one or more inlet flow characteristics to a compressor wheel to be disposed in the housing 910). The components 934 and 938 each include an upper axial dimension $\Delta z_u$, a lower axial dimension $\Delta z_l$ and a lower radial dimension, indicated as diameter $d_l$ (e.g., a trim diameter). The components 934 and 938 each include a tapered wall that tapers over the upper axial dimension $\Delta z_u$ to a constant diameter over the lower axial dimension $\Delta z_l$. However, for the components 934 and 938, the profiles differ, particularly as to the ratio of the axial lengths (e.g., ratio of $\Delta z_u$ to $\Delta z_l$). In FIG. 9, the housing 910 includes an axial dimension $\Delta z$ and a radial dimension, indicated as diameter $d_h$ (e.g., a housing diameter for receipt of the component 934 or the component 938). The axial dimensions of a component, housing, etc., may be selected to position a component with respect to an inducer portion of a compressor wheel (e.g., for purposes of trim, flow characteristics, etc.).

Figure 10:
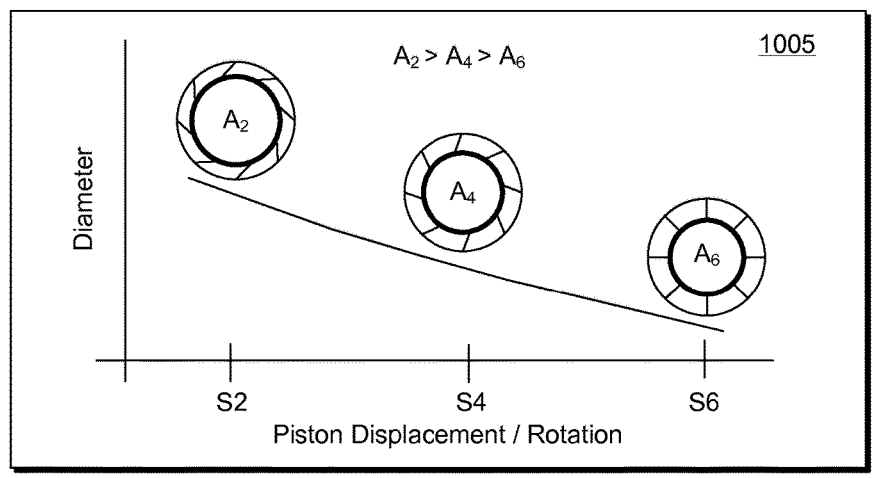
FIG. 10 is a series of cross-sectional views of an example of a compressor assembly along with a plot of diameter versus an adjustment parameter to control an adjustment mechanism.
Figure 10:
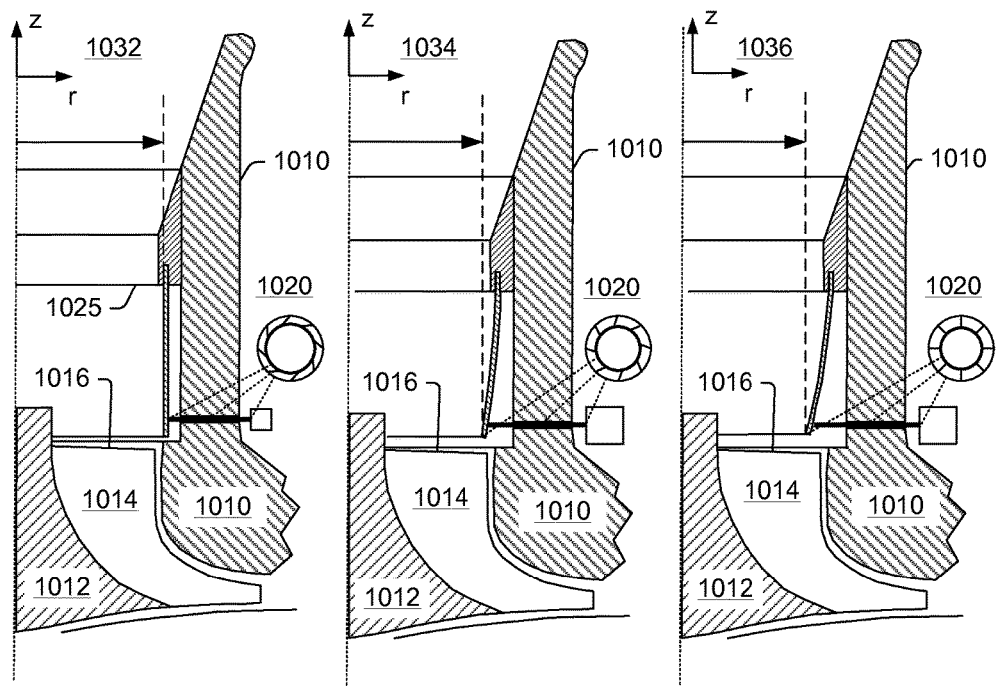

FIG. 10 shows an example of a control parameter plot 1005 and an example of an adjustment mechanism 1020 for adjusting an inlet wall component 1025, which includes a rigid wall portion and an adjustable wall portion (e.g., a leaved wall, a flexible, resilient wall, etc.). Various examples are shown 1032, 1034 and 1036 for an assembly that includes a housing 1010, a wheel 1012 having blades such as the blade 1014, which has an upper edge 1016 (e.g., an inducer edge). In the example of FIG. 10, the mechanism 1020 may be a mechanical iris, unison ring, etc., that causes bars or other features to move to thereby contact and adjust the adjustable wall portion of the inlet wall component 1025. As an example, a variety of predetermined settings may be provided, for example, as calibrated after assembly and prior to installation with respect to an internal combustion engine system. As an example, S2, S4 and S6 may correspond to predetermined settings selectable via a controller (e.g., an actuator with a link to an adjustment mechanism such as the mechanism 1020) where settings S2, S4 and S6 provide for cross-sectional flow areas A2, A4 and A6, respectively (e.g., which may be progressively smaller for alteration of trim, flow, etc.).

In the example of FIG. 10, some adjustment may occur with respect to an angle of the wall. In another example, the mechanism may act to reduce the diameter while maintaining a wall angle (e.g., flat wall). In such an example, the wall may be made of sliding components (e.g., leaves or other components) that slide with respect to each other to reduce the diameter. In such an example, an extension may act to cover a distance between the adjustable wall and a fixed wall (e.g., so as to not create an open annulus for flow).

Figure 11:
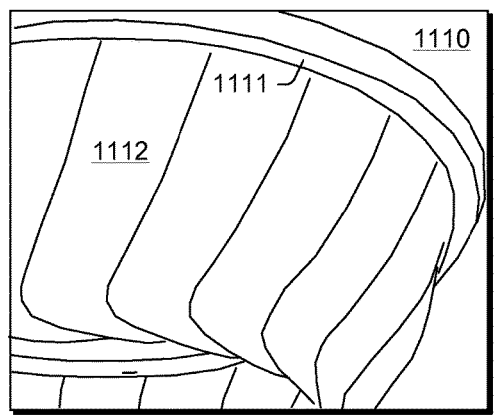
FIG. 11 is a series of views of examples of adjustable mechanisms.
Figure 11:
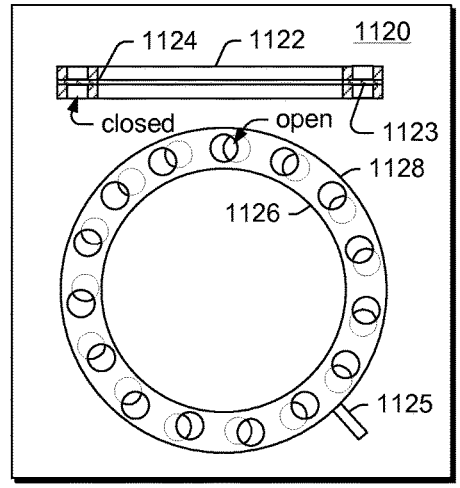
Figure 11:
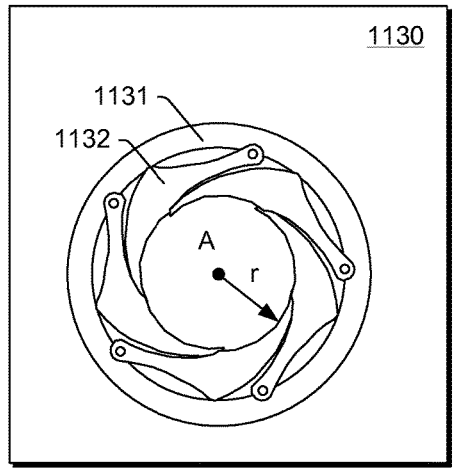
Figure 11:
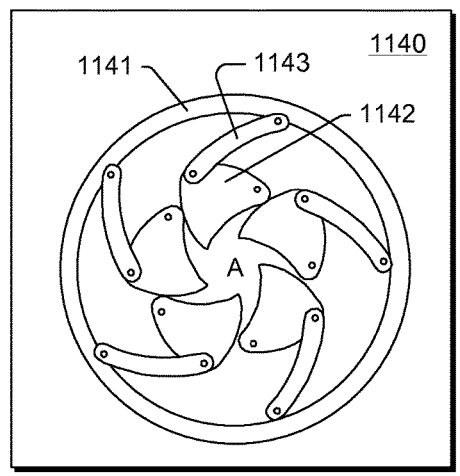

FIG. 11 shows some examples of adjustable mechanisms 1110, 1120, 1130 and 1140 that may be included in an assembly such as the assembly of FIG. 10. The mechanisms 1130 and 1140 may be referred to as mechanical irises where a ring 1131 and 1141 provide for positioning of leaves 1132 and 1142 (e.g., via linkages 1143) to adjust a central iris (e.g., alter cross-sectional area "A").

As to the mechanism 1110, a ring 1111 and leaves 1112 are shown where the leaves 1112 are curved and can overlap to varying degree to adjust cross-sectional area. While the leaves 1112 are shown without openings, such leaves may include openings. As an example, the leaves 1112 may include surface indicia or other features that act to direct flow. During operation, suction drawing air into a compressor may exert force that causes the leaves to seat tightly against each other to seal. Surfaces of the leaves 1112 may be low friction (low friction coefficient) to allow for adjustable sliding to alter inlet configuration while being subject to such force. In the example of FIG. 11, collectively, the leaves 1112 may be referred to as an adjustable wall.

As to the mechanism 1120, it includes a support ring 1122 that includes a slot 1124 to seat an adjustable ring 1123. In the example of FIG. 11, the support ring 1122 includes openings that may be adjusted between open and closed positions by rotation of the adjustable ring 1123 (e.g., via an arm 1125), which includes complimentary openings. As shown, the support ring 1122 includes an inner wall 1126 and an outer wall 1128. As an example, the outer wall 1128 may be configured for receipt by a housing such as the housing 910 of FIG. 9. As an example, the arm 1125 may be configured for receipt in the bore 911 of the housing 910 of FIG. 9, for example, where the bore 911 may be an elongated bore that allows for movement of the arm 1125 to thereby adjust the adjustable ring 1123 and effective cross-sectional flow area to a compressor wheel disposed in the housing 910. As an example, the mechanism 1120 may be combined with another mechanism (e.g., one of the mechanisms 1110, 1130 or 1140), for example, one that can adjust a cross-sectional area of the inner wall 1126 (e.g., to selectively decrease the cross-sectional area).

Figure 12:
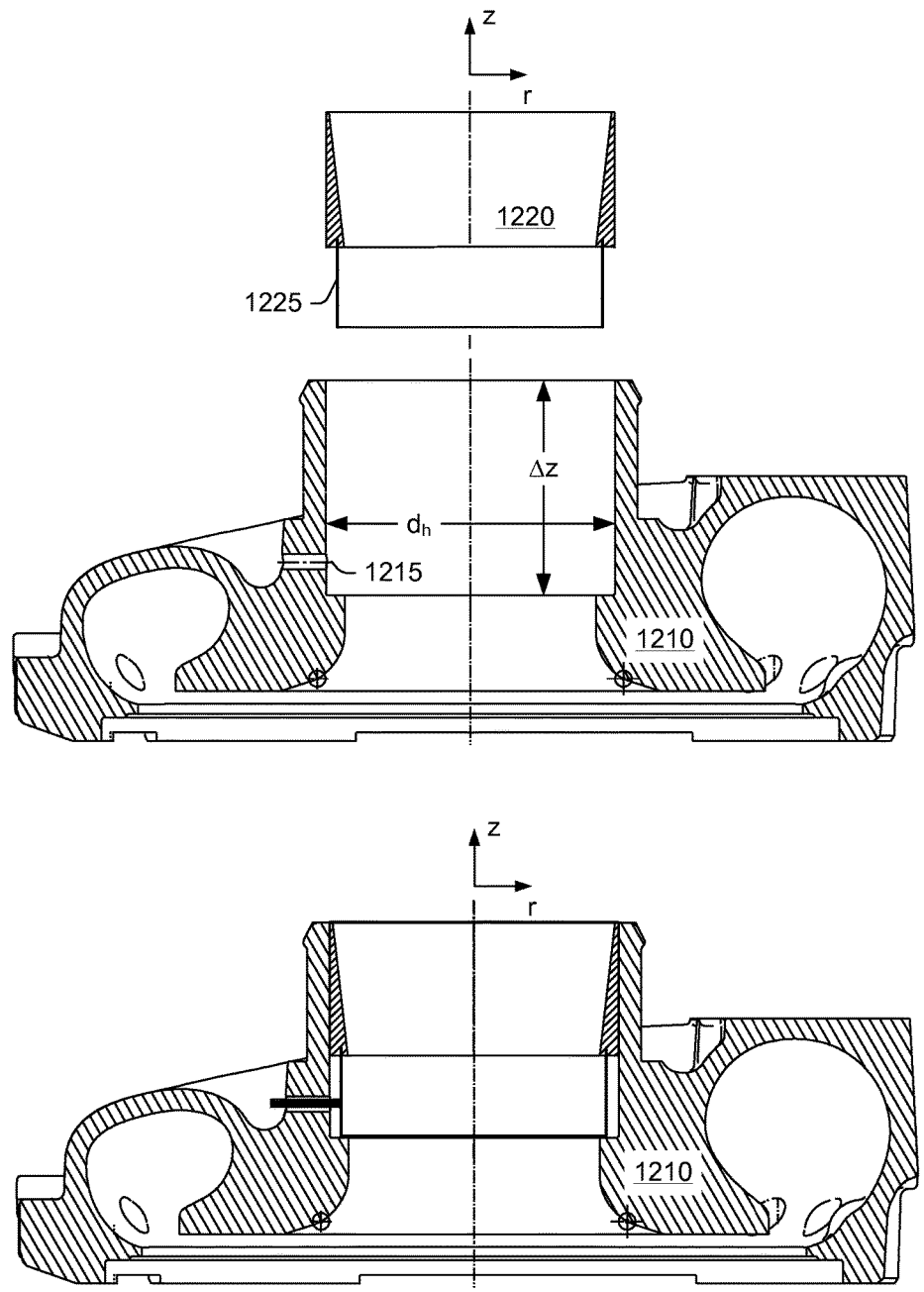
FIG. 12 is a series of cross-sectional views of an example of a housing and an example of an insert that may be received by the housing.

FIG. 12 shows an example of a housing 1210 that includes one or more features 1215 for adjustment of a wall. For example, a component 1220 includes a support wall with a flexible wall 1225. The flexible wall 1225 may be positioned such that the adjustment features 1215 of the housing 1210 provide for adjusting the flexible wall 1225. Such features may allow for mechanical access or fluid access to the flexible wall 1225 or other adjustable wall mechanism. As mentioned, a housing may include features for an adjustable wall while still being configured to receive a fixed wall insert. Hence, such a housing can offer various selectable options.

Figure 13:
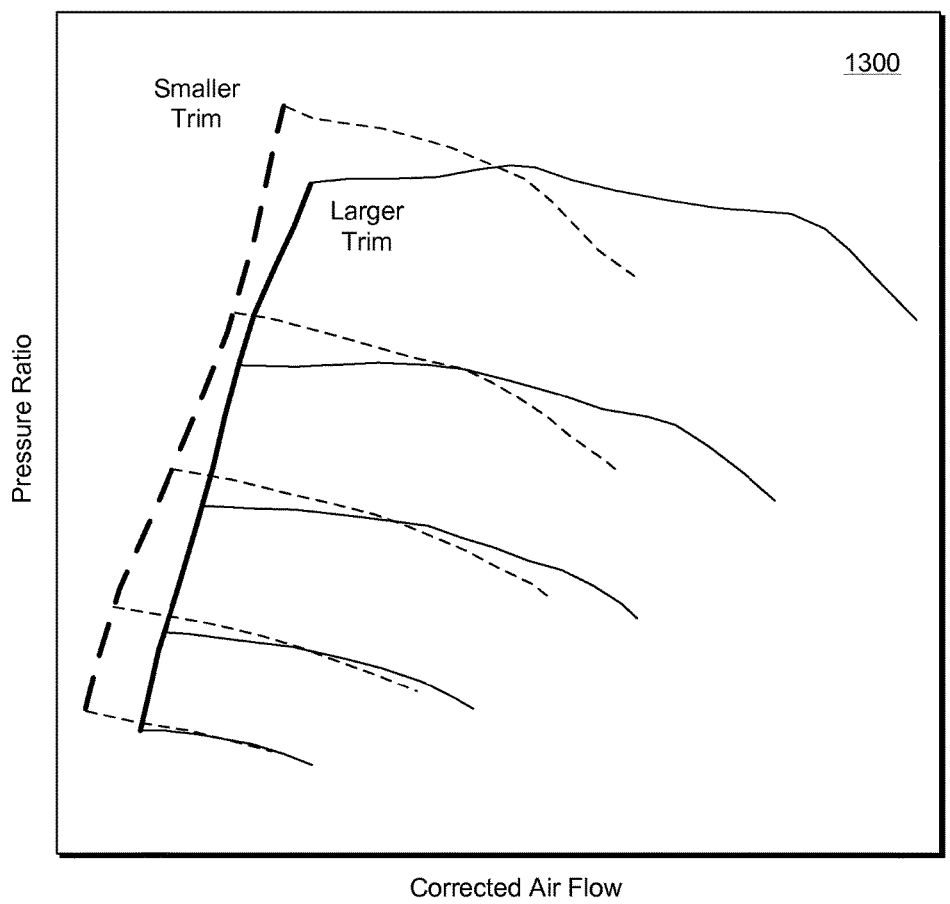
FIG. 13 is a plot of pressure ratio versus corrected flow for various trial examples.

FIG. 13 shows a plot 1300 of compressor pressure ratio versus corrected air flow for a smaller trim and a larger trim, for example, as associated with an adjustable mechanism that can increase and decrease cross-sectional flow area (e.g., to selectively adjust trim).

Figure 14:
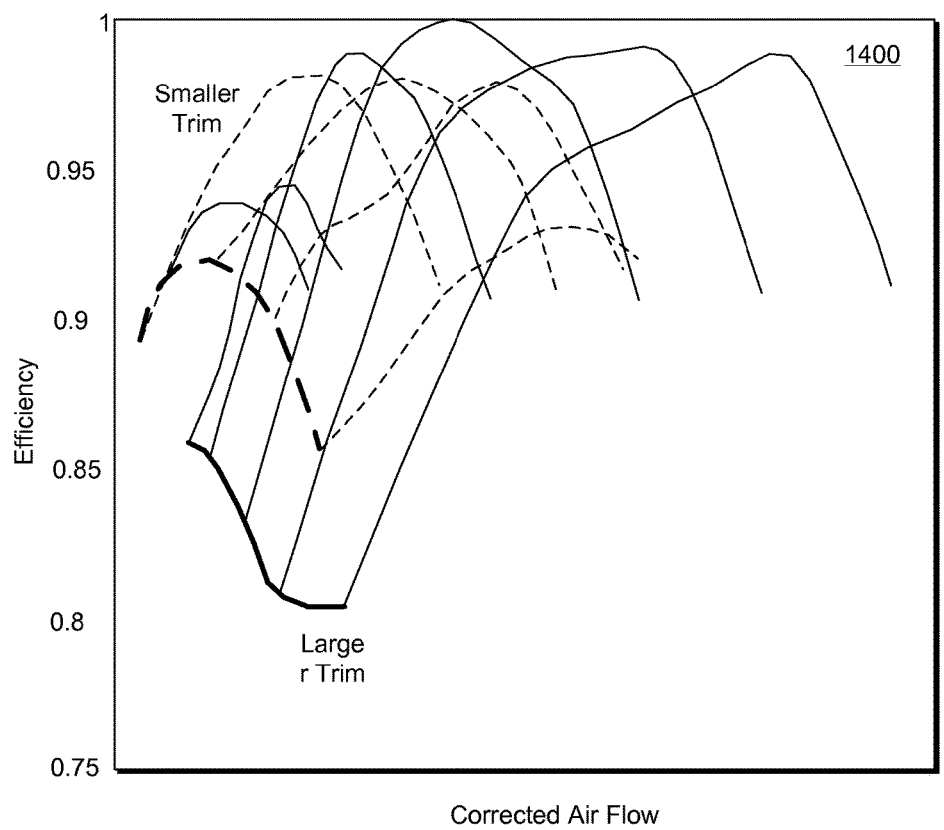
FIG. 14 is a plot of efficiency versus corrected flow for various trial examples.

FIG. 14 shows a plot 1400 of compressor efficiency versus corrected air flow for a smaller trim and a larger trim, for example, as associated with an adjustable mechanism that can increase and decrease cross-sectional flow area (e.g., to selectively adjust trim).

In various examples, an assembly can shift a surge limit such that a compressor behaves akin to a small trim compressor (e.g., increase in compressor efficiency for low flows).

Figure 15:
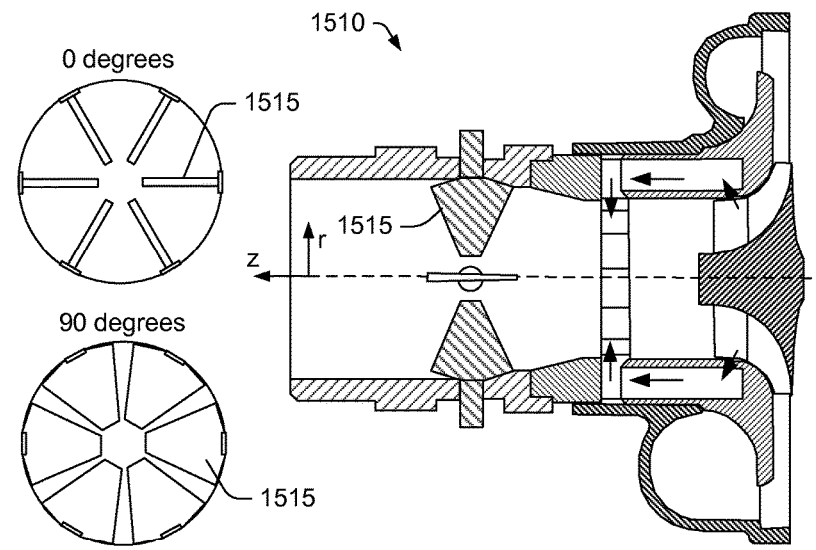
FIG. 15 is a plot of data for pressure ratio versus corrected air flow for a Variable Inlet Guide Vane (VIGV) approach.
Figure 15:
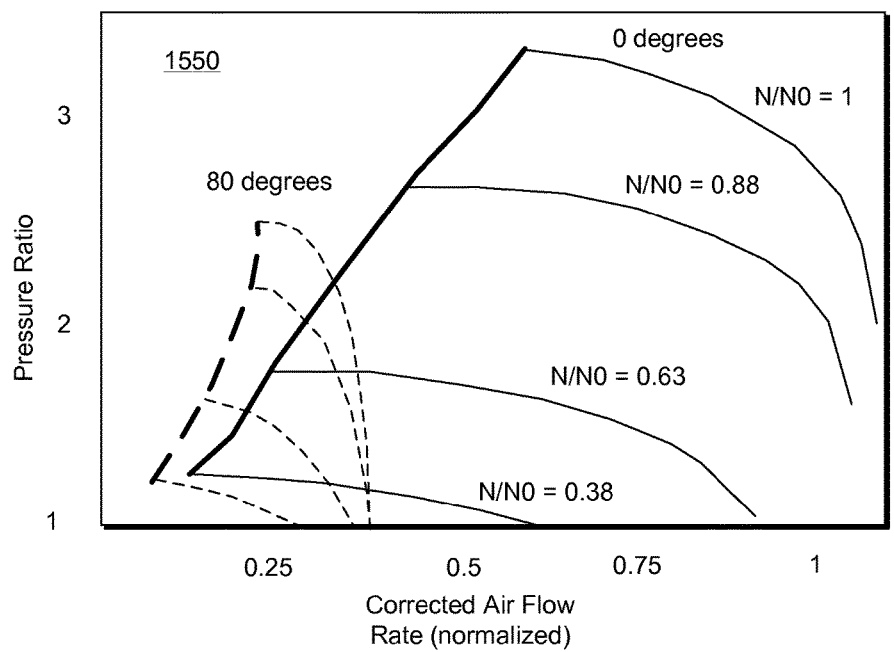

Various technologies and techniques described herein may optionally be implemented in conjunction with one or more other technologies or techniques. For example, FIG. 15 shows a Variable Inlet Guide Vanes (VIGV) mechanism 1510 that may be implemented additionally. The VIGV approach changes efficiency rapidly by rotating guide vanes 1515; noting that pressure ratios go down for such an approach, as shown in the plot 1550 of FIG. 15 (e.g., compare pressure ratios for 0 degrees and 80 degrees). A VIGV approach is described in a report by Uchida et al., "Development of Wide Flow Range Compressor with Variable Inlet Guide Vane", R&D Review of Toyota CRDL, Vol. 41, No. 3, pp. 9-14 (2006), which is incorporated by reference herein.

As described herein, an adjustable wall may act to minimize or tailor changes of a VIGV approach. As described herein, various technologies and techniques can be implemented to increase efficiency accompanied by an improvement in surge behavior.

As described herein, an adjustable wall may be adjusted in conjunction with (e.g., depending on, responsive to, etc.) one or more other control parameters, signals, etc. For example, a controller or control mechanism may control a variable geometry turbine and an adjustable wall of a compressor (e.g., to improve performance, emissions, longevity, etc.). As described herein, a compressor may optionally include an electric drive mechanism (e.g., a motor) to control load, speed, etc., on a compressor wheel. As described herein, where EGR acts to introduce exhaust upstream a compressor wheel, an adjustable wall may be adjusted to account for the exhaust and optionally one or more other operational parameters, etc. (e.g., to avoid surge, etc.).

As described herein, an assembly can include a compressor housing; an adjustable wall disposed within the compressor housing that defines an air inlet to an inducer portion of a compressor wheel; and an adjustment mechanism to adjust the wall and thereby adjust at least a diameter of the air inlet. In such an assembly, adjustment of the wall may include adjustment of an angle of the wall that defines the air inlet. In such an assembly, adjustment of the wall may adjust a surge line.

As described herein, adjustment of an angle of a wall may alter an incident angle of inlet air directed to an inducer portion of a blade of a compressor wheel. As described herein, adjustment of a diameter of a wall may alter a cross-sectional flow area of inlet air directed to an inducer portion of a blade of a compressor wheel.

As described herein, an adjustment mechanism may be a fluid pressure mechanism, a mechanical mechanism, a fluid-mechanical mechanism, or other type of mechanism. An assembly may include a controller to control an adjustment mechanism responsive to one or more operational parameters.

As described herein, a method can include operating a turbocharger and adjusting a diameter of an inlet wall to an inducer portion of a compressor of the turbocharger. Such a method may include detecting diminishing corrected flow and adjusting the diameter responsive to the detected diminishing corrected flow. Such a method may include adjusting a wall to alter a surge line. Such a method may include adjusting a diameter of an inlet wall and an angle of the inlet wall.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control an adjustable trim mechanism for a compressor (e.g., a variable geometry inlet for a compressor).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
a compressor housing;
a bladder disposed in the compressor housing that defines a diameter of an air inlet to an inducer portion of a compressor wheel; and
an adjustable wall disposed in the compressor housing wherein the adjustable wall translates axially with respect to a rotational axis of the compressor wheel to abut the bladder and define an angle of the bladder leading to the diameter of the air inlet.

2. The assembly of claim 1 wherein adjustment of the bladder adjusts a surge line.

3. The assembly of claim 1 wherein adjustment of the angle alters an incident angle of inlet air directed to an inducer portion of a blade of the compressor wheel.

4. The assembly of claim 1 wherein adjustment of the diameter alters a cross-sectional flow area of inlet air directed to an inducer portion of a blade of the compressor wheel.

5. The assembly of claim 1 wherein the bladder comprises a fluid pressure mechanism.

6. The assembly of claim 1 wherein the adjustable wall comprises a mechanical mechanism.

7. The assembly of claim 1 further comprising a controller to control at least one of the bladder and the adjustable wall responsive to one or more operational parameters.

8. The assembly of claim 1 wherein the bladder comprises a fluid pressure mechanism and wherein the adjustable wall comprises a mechanical mechanism.

9. The assembly of claim 1 wherein the adjustable wall is adjustable to cover a recess in the compressor housing.

10. The assembly of claim 9 wherein the recess comprises a recess for the bladder.

11. A method comprising:
operating a turbocharger;
adjusting a diameter of an inlet wall to an inducer portion of a compressor of the turbocharger via a bladder, wherein the compressor comprises a compressor wheel;
and adjusting an angle of the inlet wall via an adjustable wall that translates axially with respect to a rotational axis of the compressor wheel to abut the bladder.

12. The method of claim 11 further comprising detecting diminishing corrected flow with respect to the compressor and adjusting the diameter responsive to the detected diminishing corrected flow.

\* \* \* \* \*